United States Patent Office

3,679,469
Patented July 25, 1972

3,679,469
CARPET BACKSIZING WITH LATEXES OF ACIDIC OLEFIN COPOLYMERS
Carl Moore, Midland, Mich., assignor to The Dow Chemical Company, Midland, Mich.
No Drawing. Filed Feb. 24, 1970, Ser. No. 13,833
Int. Cl. B32b 27/06
U.S. Cl. 117—161 UZ
10 Claims

ABSTRACT OF THE DISCLOSURE

Carpets and other fibrous textile products are backsized with latexes of acidic copolymers of olefins such as ethylene and acidic comonomers such as acrylic acid by applying the latex, drying and fusing the copolymer in place.

BACKGROUND OF THE INVENTION

Olefin polymers such as polyethylene and copolymers of ethylene are known to be used as carpet backing applied in some instances as a self-supporting sheet or film which is subsequently melted by heating to effect bonding, in some instances as an extruded molten sheet or film bonded while still hot, and in some instances as a powder which is subsequently melted by heating to form a fused layer bonded to the carpet. These known methods and resulting products are usually not entirely satisfactory in one or more respects such as the strength of bond of the backing to the carpet, the uniformity of the coating, the degree of penetration of the polymer composition into the carpet structure such as the jute and fiber bundles and the resulting securing of the tufts in place, and the relation between the strength and the weight of the backing layer.

Accordingly, it is among the objects of the present invention to provide improvement in backing carpets and other fibrous textile products with olefin polymers and particularly to provide method, means and resulting products wherein the olefin polymer backing is well penetrated into the underneath side of the textile structure and into the various fibers and fiber bundles thereof, is well bonded to such fibers, elements and structures, and has high strength with minimal added coating weight.

These and other objects and advantages of this invention are attained by the practice as set forth in detail hereinafter of applying certain acidic copolymers of olefins such as ethylene and acid comonomers such as acrylic acid in the form of aqueous colloidal dispersions, i.e., latexes, as coating to the backside of the fibrous article, e.g., carpet, drying the coating and heating the residue to fuse the copolymer in place.

The latex composition readily penetrates the fibrous carpet structure including the substrate web and the back side of the loops and tufts and the fibers and fiber bundles of the carpet structure. When dried and fused, the copolymer bonds exceptionally well to the fibrous elements firmly locking them in place and forming an impervious layer even at minimal coating weight.

DETAILED DESCRIPTION AND EMBODIMENTS

The copolymers with which this invention is concerned are normally solid, thermoplastic, addition copolymers which comprise moieties of an olefin such as ethylene and moieties of a carboxylic acid comonomer such as acrylic acid. Other olefins are propylene, butene-1 and mixtures of olefins. Other acid comonomers are polymerizable monoethylenically unsaturated carboxylic acids such as methacrylic acid, crotonic acid, maleic acid and anhydride, itaconic acid, fumaric acid, citraconic acid and anhydride, methyl hydrogen maleate, and the like. The copolymers may contain copolymerized therein one or more of the olefin monomers, one or more of the acid comonomers, and may also contain copolymerized therein one or more other monoethylenically unsaturated monomers such as ethyl acrylate, methyl acrylate, ethyl methacrylate, vinyl acetate, acrylonitrile, and the like. Specific examples are: copolymers of ethylene and acrylic acid; copolymers of ethylene and methacrylic acid; copolymers of ethylene, propylene and acrylic acid; copolymers of ethylene, butene-1 and methacrylic acid; copolymers of ethylene and methyl hydrogen maleate; copolymers of ethylene, acrylic acid and ethyl acrylate; copolymers of ethylene, methacrylic acid and vinyl acetate; and copolymers of ethylene, propylene, acrylic acid and ethyl acrylate.

In other modifications the latex copolymer is caused to contain both carboxylic acid groups and aminoalkyl esters of such carboxylic acid groups, either by copolymerizing a monomeric mixture containing both kinds of monomers, such as copolymerizing ethylene, acrylic acid, and 2-(dimethylamino)ethyl methacrylate, or by reacting a carboxylic acid copolymer with an imine sufficient to react with some of the acid groups, such as interacting an ethylene/acrylic acid copolymer with ethylenimine or propylenimine.

Particularly preferred are those copolymers having from about 2 to about 15 mole percent of carboxylic acid comonomer, e.g., ethylene copolymers having from about 5 to about 30 weight percent of acrylic acid or equivalent proportions of other acid comonomers based on the total weight of the copolymer. The copolymers preferably contain at least 65 weight percent of olefin and may contain up to about 30 percent of another comonomer as indicated hereinbefore.

Copolymers as indicated and methods for making the same are known to the art. In some instances the copolymers are made directly in aqueous colloidal form by polymerization of the monomers in aqueous emulsion. Copolymers made by copolymerization in mass or solution can be converted into aqueous colloidal form by known means, e.g., as described in U.S. Pat. No. 3,389,109. By whatever means of preparation, it is desirable that the latex compositions for use herein have colloidally dispersed polymer particles of average size in the order of from about 0.02 to about 0.5 micron, preferably from about 0.05 to about 0.3 micron. Usually, the compositions are employed wtih solids content as high as can be obtained and handled, for example, at from about 40 to about 60 weight percent, in order to minimize the amount of water that must be vaporized and removed, but latexes of any lower concentration can be used.

It is preferable that the copolymer in the aqueous latex composition be substantially in the free carboxylic acid form or in a form readily convertible thereto on drying and fusion, because the free carboxylic acid groups appear to effect significantly greater adhesion bonding to the textile fibers and to the other solid constituents of the formulation that does the fully neutralized stable salt form. Thus, latexes in which the acid groups are neutralized with ammonia are very satisfactory because the latexes are stable in the wet form, and the ammonium salt dissociates on drying and fusion, forming free acid groups for bonding. Latexes in which only a portion, e.g., up to about 50%, of the acid groups are neutralized with sodium, potassium, and the like non-fugitive cations (and the remaining carboxylic groups are free acid groups or are neutralized with fugitive cations such as ammonium) are stable as latexes and have good bonding when dry and fused.

The aqueous latex coating compositions of acid/olefin copolymers as above described can also contain other additives such as mineral fillers, e.g., clay, whiting, silica, diatomaceous earth, fuller's earth, mica, barytes, etc., which serve to extend the coating compositon and provide opacification. When used, such fillers are generally employed in proportions up to about 300 weight percent based on the copolymer solids in the latex composition.

The aqueous latex coating compositions as described also advantageously can contain those functionally active materials that are capable of interacting with the carboxylic acid groups of the olefin/acid copolymers to effect curing or crosslinking thereof. These materials, called coreactive materials herein, include compounds of polyvalent metals such as zinc oxide, hydroxide, and carbonate and zinc ammonium complex salts, calcium hydroxide, and the like ionizable polyvalent metal compounds that are capable of forming bridges between carboxylic acid groups and are known to impart a kind of vulcanization to carboxylic acid copolymers. Coreactive materials also include water soluble and readily water dispersible polyfunctional organic reactants which have at least two groups reactive with and capable of bridging between carboxylic acid groups on the latex copolymer, such as primary amino, secondary amino, carboxyamido, methylolcarboxamido, primary hydroxyl, secondary hydroxyl, and epoxy groups, and groups having basic nitrogen-containing rings. Examples of such coreactive materials are melamine, melamine-formaldehyde condensates (containing methylol groups), partially methylated melamine-formaldehyde condensates (containing methoxymethyl groups), urea, urea-formaldehyde condensates, methylated urea-formaldehyde condensates, phenol-formaldehyde condensates, ammonia - formaldehydehydrochloric acid condensates, liquid epoxy resins having at least two epoxy groups per molecule, ethylenediamine formaldehyde condensates, polyethylenimine, ethylene diamine, diethylene triamine, triethylene tetramine and acetate thereof, trimethylene diamine, hexamethylene diamine, decamethylene diamine, tetraethylene pentamine, guanidine, formoguanamine, benzoguanamine, and dicyandiamide. In use, the coreactive materials are dissolved or dispersed in water or water-miscible solvents and mixed with the starting copolymer latex and other constituents of the coating composition in proportions of from about 1 to about 100 weight percent of coreactive material based on the copolymer in the composition.

The aqueous coating compositions as described can also contain other formulating ingredients familiar to those skilled in the polymer and coating arts, such as antioxidants, surface-active agents, plasticizers, tackifiers, dyes and pigments, thickening agents, and like modifying agents, as well as odorants, deodorants, reodorants, moth repellants, insecticides and other pesticides.

Material for backing in accordance with this invention can be any kind of fibrous material. Particularly benefited are those constructions in which face or wear layers of fibers are worked onto a woven substrate. In the case of carpeting, the substrate can be burlap, woven of jute, hemp or the like, or polypropylene, or polyolefin-treated string. The face material can be fibers of polypropylene, rayon, nylon, wool, cotton, acrylic, modacrylic, polyester, or other materials otherwise suitable for the purpose.

The coating operations are carried out by applying a thin layer of the latex composition to the back of the starting structure, e.g., to the carpet back. This application is carried out by spraying, wiping, transferring from a transfer roll, speading with doctor knives or air knives or other means capable of providing a thin layer of the aqueous latex composition. It is desirable that the means be capable of applying a uniform and very thin layer of the coating composition because one of the features of this invention is that the acid copolymer composition which is formed provides unexpected strength and desirability at very low coating weights, e.g., at 15 ounces or less of copolymer solids per square yard. Temperatures of the latex and carpet or other structure are not critical during the coating step, provided the latex is stable at the temperature employed. Room temperature is satisfactory and convenient, although warmer temperatures are sometimes employed to obtain better penetration of the fibers and faster drying in the following step.

The drying step is carried out by circulating air over the coating with or without heating. If the drying is carried out at ambient temperatures below the fusion temperature of the dried copolymer residue from the latex coating, the drying step is followed by the fusion step. If the drying is carried out at ambient temperatures above the fusing temperature of the dried copolymer residue, the overall effect of drying and fusion may be carried out in what appears to be a single step, although there is some tendency for moisture to be trapped in the layer as it begins to fuse before it is entirely dry, causing bubbles and opacity in the resulting layer. It is preferred to effect thorough drying before fusing the copolymer coating, although the steps can be carried out in an integrated, successively continuous manner, as by running the fibrous web through a coating station, thence to a drying station, and finally to a fusing station.

The fusion of the dried coating residue of the described composition can be effected by any suitable means for heating such residue to the fusion temperature thereof. By "fusion temperature" is meant the temperature at and above which the solid particles of copolymer tend to melt and flow together forming a substantially continuous and coherent film. Thus, the coated article can be passed through an oven or over heated rolls. Preferably, the coated side is exposed to radiant energy, preferably infrared heat from infra-red lamps or gas burners, because such sources allow the heat to be directed to and concentrated on the fusible coating residue with maximum efficiency and minimum exposure of the fibrous elements of the structure to possibly deleterious effects of heat.

The fusion of the dried coating residue by heat also effects curing or crosslinking where the coating composition contains the hereinbefore mentioned materials that are coreactive with the carboxylic acid copolymer. Also heat causes dissociation of fugitive base salts of the acid groups, such as the ammonium salts, thereby generating carboxylic acid groups in the copolymer constituent of the coating.

The higher the ambient temperature or energy of radiant heat employed during the fusion step, the sooner will fusion and curing temperature be reached in the coating residue layer and fusion thereof be effected. Usually, such fusion and curing temperature is in the range from about 135° to about 185° C., although somewhat lower temperatures can be used with longer times or more sensitive materials, and somewhat higher temperatures (up to the decomposition point) can be used with correspondingly shorter times or with more heat-stable, higher melting materials.

The process and resulting products can be modified by providing an additional structural element to the back side of the first structure just described. For example, a scrim of loosely woven fabric or a mat of randomized non-woven fiber can be laid onto the backside of a coated carpet after the coating step, while the latex coating is still wet, or after the drying step but before the fusion step, and the composite structure carried through the successive steps as hereinbefore described to cause the additional scrim or mat to become bonded to the first carpet structure. Alternatively, the carpet having already been provided with a fused coating layer on its underside by latex coating, drying and fusing as aforesaid, is run through the process a second time, with the additional scrim or mat being laid onto the backside of the carpet together with the second latex coating and carried through the fusion step as a composite structure. Where the additional scrim is very thin or open structured, the scrim can be put in place on the backside of the untreated first structure and the latex coating applied to penetrate at once through the scrim and into the principal article base fibers, thereby, after drying and fusing as described, causing the whole structure to become bonded and locked together.

Usually the carpet and like products of this invention are flat goods, capable of being rolled cylindrically on standard carpet reels or textile bolts and rolled flat when installed as floor covering and the like.

Alternatively, the carpet product can be molded to three-dimensional contours, such as the shape of an automobile floor or the riser-tread-nosing of a stair step. Preferably, the molding step is performed on the carpet product immediately after or during the fusion step (i.e., the step of fusing the dried latex coating residue) of the process herein described, while the coated carpet is still hot. However, the molding step can be performed on flat goods having thermoplastic copolymer backsizing by reheating the coated backing to soften it before causing the article to conform to the mold. Molding of carpets with thermoplastic backside coating is a simple operation of conforming the heated carpet to the mold at a temperature such that the coated backing is soft and flexible and holding that shape while lowering the temperature to cause the coating to harden and stiffen. Molding of carpets having curable latex backside coatings is better done concurrently with the initial fusion and curing step by using a heated contour mold.

The method and means herein described can be used for back-sizing and coating fabrics and textiles other than carpeting, such as upholstery and drapery materials, especially such materials that have pile or other surface elements worked into a substructure, such as velours, brocades, boucles, looped woven goods and the like, where the herein described latex copolymer binds the fiber elements into a more secure structure and seals the backing to reduce permeability.

The following examples illustrate the invention but are not to be construed as limiting its scope. Parts and percentages are by weight unless otherwise noted.

EXAMPLE 1

Loop pile construction wool carpeting was used in this example. It had density of 37.7 ounces per square yard, of which 9.3 ounces was jute backing and 28.4 ounces was wool yarn.

Samples of such carpeting were coated with an aqueous colloidal dispersion (latex) of random copolymer of ethylene, ethyl acrylate, and acrylic acid, 78/11/11 ratio by weight. The latex had solids content of 44% and surface tension 61.3 dynes per cm. It had been neutralized with ammonium hydroxide to pH 7.7. Particle size of the dispersed solid copolymer ranged from about 0.08 to about 0.3 micron.

Three samples of the carpeting were treated by applying to their back side a portion of the latex and spreading the same with a wiping bar to obtain a uniform thin layer in amount resulting in the dried coating weights shown in Table I. One portion of latex was first compounded with an equal weight of a water slurry containing 44% of finely divided calcium carbonate, i.e. to provide an amount of calcium carbonate filler equal in weight to the copolymer solids content of the latex, and the resulting compounded latex was coated in a manner just described on a fourth sample of carpeting.

Each resulting coated carpet sample was then air dried. After drying, samples 1, 2 and 4 were then exposed to infra-red heat on the coated side until the coating were fused, after which they were cooled to room temperature.

The back side coating was found to have well penetrated the fibrous structure and to be well bonded thereto. Additionally, the fused coatings had formed a substantially continuous film layer which was practically impermeable to liquids and gases.

The resulting back size coated carpet products were tested as to tuft lock strength by industry standard method with results shown in Table I.

TABLE I

| Test | Coating weight, oz./yd.² [a] | | | Tuft lock strength | |
|---|---|---|---|---|---|
| | Polymer solids | CaCO₃ | Fused | Top of carpet | Bottom of carpet |
| 1 | 14.9 | None | Yes | Exceeded tensile strength of loop. | Exceeded tensile strength of loop. |
| 2 | 15.0 | do | Yes | do | Do. |
| 3 | 12.38 | do | No | do | 4 lbs. |
| 4 | 8.73 | 8.73 | Yes | Exceeded 11 lbs. | 3.3 lbs. |

[a] Dry basis.

To illustrate moldability of these latex coated carpet products, the carpet sample of Test 4 of Example 1 was taken from the infra-red fusion step and while still hot was shaped over a contoured mandrel and allowed to cool; thereafter it retained its contoured shape during normal handling. On reheating to above the fusion temperature of the copolymer coating, the contoured carpet piece could be reshaped and again set on cooling.

The carpet sample product of Test 2 of Example 1 was soaked in perchloroethylene for five minutes, then towel dried, illustrative of dry cleaning. No damage occurred to the carpet fiber or back sizing and the tuft lock strength remained high.

EXAMPLE 2

Loop pile construction carpeting made of continuous filament nylon and designed for use as carpeting in automobiles was used in four tests in this example. One test was made with another sample of the loop pile wool carpet described in Example 1.

Some of these tests (identified in Table II) were carried out with further amounts of the ethylene/ethyl acrylate/acrylic acid copolymer latex described in Example 1. In other tests a portion of that latex was compounded with a water solution of melamine derivatives, containing (65% total solids) one part of water-soluble melamine formaldehyde resin (having methylol groups therein) and two parts of water-soluble methoxyether of melamine formaldehyde resin (having methoxymethyl groups thereon), in amount corresponding to 5 parts of such melamine derivative solids per 100 parts of the latex copolymer solids. The melamine derivatives are illustrative of the coreactive materials which react with the carboxylic acid groups of the copolymer during subsequent drying and fusion to effect a curing action.

In each test, the latex or formulation thereof was spread thinly over the back side of the carpeting with a wiping bar in amounts giving the coating weight, on dry basis, shown in Table II. The latex-coated carpet samples were air dried, then the coatings were exposed to infrared heat, to effect fusion, for the times in minutes shown in the table. The security of the tufts (tuft lock) bound in the carpet structure by the resulting fused adhesive layer was tested by industry standard method with the results shown in Table II.

TABLE II

| Test | Carpet fiber | Melamine derivative in latex, percent | Coating weight, oz./yd.² [a] | Fusion time, minute | Tuft lock, in pounds | |
|---|---|---|---|---|---|---|
| | | | | | Top pull | Bottom pull |
| 1 | Nylon | .5 | 11.0 | 1.5 | 16.5 | 4.4 |
| 2 | do | 5 | 14.4 | 1.5 | 13.2 | 4.3 |
| 3 | do | None | 8.0 | 2 | 11.0 | 3.3 |
| 4 | do | None | 16.1 | 2 | 11.0 | 4.3 |
| 5 | Wool | 5 | 10.8 | 1 | >9.0 | 2.2 |

[a] Dry basis.

EXAMPLE 3

In this example there is used an upholstery fabric constructed of a woven cotton cloth base with a looped pile face of rayon fiber threads. Although originally attractive, such fabric has a characteristic objection in that snagging the loops is commonplace and results not only in pulling out the snagged loop, forming an unsightly long string, but in pulling down adjacent loops that are part of the thread of the snagged loop, causing flat streaks, knots or puckers in the upholstery fabric.

In accordance with this invention, a test piece of such fabric is coated on the reverse side with a thin layer of latex coating composition prepared from the latex described in Example 1 except that there is first added thereto a small proportion of water-dispersible, high molecular weight neutralized polyacrylic acid thickener to increase the viscosity of the latex coating composition and prevent its "striking through" the cotton base cloth to the face of the fabric. After drying, the coated side of the fabric is heated under infra-red heat to fuse the latex copolymer residue. The resulting "bonded fabric" resists loop pullout. In a test of such bonded fabric, a pull of 13 pounds on a loop of the rayon face threads did not pull out the loop or cause any slippage in the fabric.

In place of carpeting and upholstery fabric used in the foregoing examples, other textile products as hereinbefore described can be used with similarly advantageous results in bonding the fiber elements on the back side thereof into secure structures. In place of the particular copolymer latexes and compositions, other such latexes and compositions can be used as hereinbefore set forth and claimed.

What is claimed is:

1. In the art of back side coating of fibrous textile products to bond together the fiber elements thereof, the improvement which comprises applying to the back side of the fibrous textile product a thin coating of an aqueous coating composition consisting essentially of a latex colloidal dispersion of normally solid addition copolymer, which copolymer comprises moieties of an olefin and moieties of a monoethylenically unsaturated carboxylic acid comonomer in amount from about 2 to about 15 percent of the moieties in the copolymer, the latex comprising particles of copolymer in the size range from about 0.02 to about 0.5 micron, the copolymer having its acid groups in a form which provides a substantial proportion of free carboxylic acid groups when dry and fused, and optionally up to about 300 weight percent based on the copolymer solids of colloidally dispersed solid filler and optionally from about 1 to about 100 weight percent based on the copolymer solids of coreactive material capable of curing the composition on drying and fusing the coating residue by interacting with and forming chemical bridgings between carboxylic acid groups on the copolymer, drying the resulting coating, and fusing the residue of the coating composition by heating at a temperature above the fusion point of the copolymer constituent of the coating.

2. The improvement according to claim 1 wherein the copolymer is a copolymer of ethylene and from about 5 to about 30 weight percent acrylic acid.

3. The improvement according to claim 1 wherein the copolymer is a copolymer of at least about 65 percent ethylene, up to about 30 percent ethyl acrylate, and from about 5 to about 30 percent acrylic acid, by weight.

4. The improvement according to claim 1 wherein the acid copolymer constituent of the latex is at least partially in the ammonium salt form.

5. The improvement according to claim 1 wherein the aqueous coating composition also contains said colloidally dispersed solid filler.

6. The improvement according to claim 1 wherein the aqueous coating composition also contains dispersed therein said coreactive material.

7. The improvement according to claim 1 wherein the fibrous textile product is a carpet structure, the copolymer constituent of the latex is a copolymer of at least about 65 weight percent ethylene and from about 5 to about 30 weight percent acrylic acid at least partially neutralized with ammonia, the thin coating of aqueous coating composition after application to the back side of the carpet is dried in air at temperature below the fusion temperature of the copolymer constituent of the composition, and thereafter the dried coating residue is fused by heating with infra-red heat.

8. The improvement according to claim 7 wherein the aqueous coating composition also contains dispersed therein said coreactive material.

9. The improvement according to claim 8 wherein said coreactive material comprises water-soluble melamine formaldehyde resin having methylol groups thereon.

10. Back-side coated fibrous textile products having, on the back side and well-penetrated into and bonded to the fibrous elements thereof, a dried and fused thin coating layer consisting essentially of normally solid addition copolymer comprising moieties of an olefin and from about 2 to to about 15 percent based on the copolymer of moieties of a monoethylenically unsaturated carboxylic acid comonomer in which a substantial proportion of the carboxylic groups are in the free acid form, and optionally up to about 300 weight percent based on the copolymer of colloidally dispersed solid filler and optionally from about 1 to about 100 weight percent based on the copolymer of coreactive material interacted with and forming chemical bridgings between carboxylic acid groups on the copolymer effecting curing of the dried and fused coating layer.

References Cited

UNITED STATES PATENTS

| | | | |
|---|---|---|---|
| 3,256,228 | 6/1966 | Tyran | 161—67 X |
| 3,467,563 | 9/1969 | Mason | 117—161 UC |
| 3,506,604 | 4/1970 | Benjamin | 117—161 UT |
| 3,484,338 | 12/1969 | Britton et al. | 117—161 UH |
| 3,067,482 | 12/1962 | Hollowell | 161—67 X |
| 3,520,861 | 7/1970 | Thomson et al. | 117—161 UH |

WILLIAM D. MARTIN, Primary Examiner
D. COHEN, Assistant Examiner

U.S. Cl. X.R.

117—138.8 E, 143 A, 161 UT; 161—67